(12) United States Patent
Yoshii et al.

(10) Patent No.: US 12,158,744 B2
(45) Date of Patent: Dec. 3, 2024

(54) ANALYSIS DEVICE, ANALYSIS SYSTEM, ANALYSIS METHOD, AND STORAGE MEDIUM

(71) Applicant: KABUSHIKI KAISHA TOSHIBA, Tokyo (JP)

(72) Inventors: Takanori Yoshii, Kawasaki (JP); Hiroaki Nakamura, Kawasaki (JP); Takehiro Kato, Yokohama (JP); Makoto Tsuji, Yokosuka (JP); Yasuo Namioka, Nerima (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 41 days.

(21) Appl. No.: 17/653,193

(22) Filed: Mar. 2, 2022

(65) Prior Publication Data

US 2023/0085797 A1   Mar. 23, 2023

(30) Foreign Application Priority Data

Sep. 21, 2021  (JP) ................................ 2021-153291

(51) Int. Cl.
*G05B 19/4093*  (2006.01)
(52) U.S. Cl.
CPC .................. *G05B 19/40938* (2013.01); *G05B 2219/23219* (2013.01)

(58) Field of Classification Search
None
See application file for complete search history.

(56) References Cited

U.S. PATENT DOCUMENTS

| 2018/0144500 | A1  | 5/2018 | Lam et al. |
| 2018/0165978 | A1* | 6/2018 | Wood .................... G06T 19/006 |
| 2018/0238810 | A1  | 8/2018 | Inoue et al. |

FOREIGN PATENT DOCUMENTS

| JP | 2001-282349 A | 10/2001 |
| JP | 2012-7985 A | 1/2012 |
| JP | 2015-153035 A | 8/2015 |
| JP | WO 2017/033561 | 3/2017 |
| JP | 2018-84954 A | 5/2018 |

* cited by examiner

*Primary Examiner* — Ryan A Jarrett
(74) *Attorney, Agent, or Firm* — Oblon, McClelland, Maier & Neustadt, L.L.P.

(57) ABSTRACT

According to one embodiment, an analysis device performs an analysis related to a plurality of tasks of a manufacturing process. The analysis device receives an image when each of the plurality of tasks is performed. The analysis device receives the images from an imaging device acquiring the images. The analysis device receives a detection signal from a tool used in at least one of the plurality of tasks. The detection signal is detected by the tool. The analysis device refers to end determination data for determining an end of each of the plurality of tasks. The analysis device determines the end of each of the plurality of tasks based on the images, the detection signal, and the end determination data.

11 Claims, 13 Drawing Sheets

CHECKLIST

| TASK | START TIME | END TIME | MAN-HOURS | CHECK |
|---|---|---|---|---|
| Step1 | 9:00 | 10:00 | 1:00 | ✓ |
| Step2 | 10:00 | 11:30 | 1:30 | ✓ |
| Step3 | 13:00 | 13:30 | 0:30 | ✓ |
| ... | ... | ... | ... | ... |
| StepN | 16:30 | 17:00 | 0:30 | ✓ |

FIG. 4

| PROCESS | HISTORY | MAN-HOURS | | DIFFERENCE FROM STANDARD |
|---|---|---|---|---|
| 1.START | ⌒ | 00:00.30 | STANDARD 00:02.16 | -00:01.86 |
| 2.COMPONENT | | 00:00.00 | STANDARD 00:06.49 | 00:00.00 |
| 3.PRE-ASSEMBLY | | 00:00.00 | STANDARD 00:04.63 | 00:00.00 |
| 4.POST-ASSEMBLY | | 00:00.00 | STANDARD 00:05.38 | 00:00.00 |
| 5.INSPECTION | | 00:00.00 | STANDARD 00:09.30 | 00:00.00 |
| TOTAL | | 00:00.00 | STANDARD 00:27.95 | 00:00.00 |

ANALYSIS DEVICE, ANALYSIS SYSTEM, ANALYSIS METHOD, AND STORAGE MEDIUM

CROSS-REFERENCE TO RELATED APPLICATIONS

This application is based upon and claims the benefit of priority from Japanese Patent Application No. 2021-153291, filed on Sep. 21, 2021; the entire contents of which are incorporated herein by reference.

FIELD

Embodiments described herein relate generally to an analysis device, an analysis system, an analysis method and a storage medium.

BACKGROUND

It is desirable to develop technology that can automatically perform an analysis of a task.

BRIEF DESCRIPTION OF THE DRAWINGS

FIG. 4 is a table illustrating the task data.

DETAILED DESCRIPTION

Figure 1:
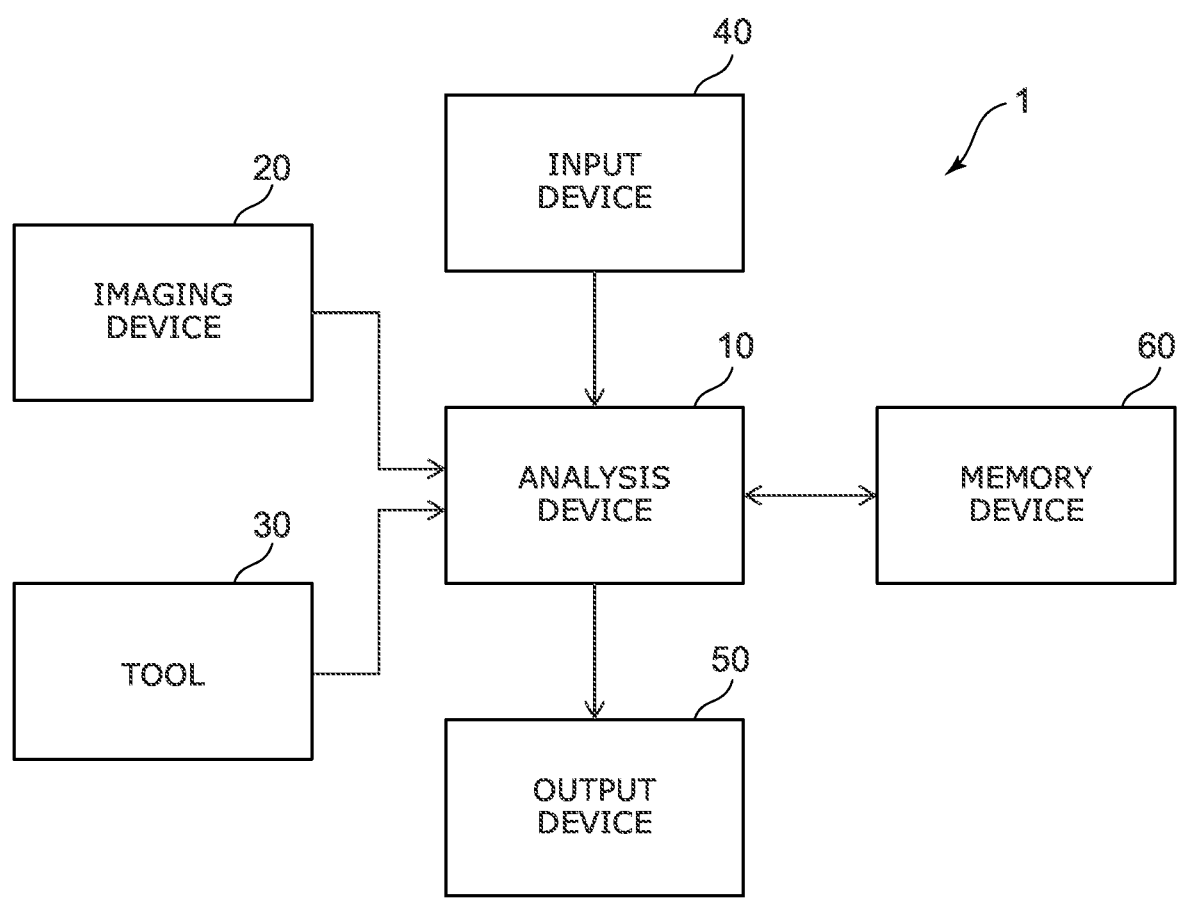
FIG. 1 is a schematic view showing an analysis system according to an embodiment.

According to one embodiment, an analysis device performs an analysis related to a plurality of tasks of a manufacturing process. The analysis device receives an image when each of the plurality of tasks is performed. The analysis device receives the images from an imaging device acquiring the images. The analysis device receives a detection signal from a tool used in at least one of the plurality of tasks. The detection signal is detected by the tool. The analysis device refers to end determination data for determining an end of each of the plurality of tasks. The analysis device determines the end of each of the plurality of tasks based on the images, the detection signal, and the end determination data.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a schematic view showing an analysis system according to an embodiment.

As shown in FIG. 1, the analysis system 1 includes an analysis device 10, an imaging device 20, a tool 30, an input device 40, an output device 50, and a memory device 60.

The analysis device 10 performs an analysis related to multiple tasks of a manufacturing process. The imaging device 20 acquires an image. The imaging device 20 may acquire a video image and may cut out images from the video image. The imaging device 20 images a work site. The imaging device 20 may be attached to a worker. Multiple imaging devices 20 may be provided. For example, the imaging devices 20 are located at multiple workplaces at which the tasks may be performed.

The tool 30 is used in a task and detects a signal in the task. For example, the tool 30 is a digital torque wrench or a digital caliper. The tool 30 includes at least one selected from the group consisting of a torque sensor, an acceleration sensor, and an angular velocity sensor. Multiple tools 30 may be prepared, and a different tool 30 may be used for each task. The imaging device 20 and the tool 30 transmit the acquired data to the analysis device 10.

The input device 40 is used by a user to input data to the analysis device 10. The input device 40 includes at least one selected from the group consisting of a mouse, a keyboard, a microphone (audio input), and a touchpad. The output device 50 outputs information toward the user. The output device 50 includes at least one selected from the group consisting of a display, a projector, a speaker, and a printer. For example, the worker wears smart glasses that include the imaging device 20, the input device 40 (the microphone), and the output device 50 (the display). An input device such as a virtual keyboard, virtual buttons, etc., may be displayed in the output device 50. The imaging device 20 may image the appearance of the user operating the virtual input device; and the analysis device 10 may accept the input from the user based on the imaging result. In other words, the analysis device 10 may be configured to perform a hand gesture input based on motion detection. The memory device 60 appropriately stores task data, data obtained by the processing of the analysis device 10, data obtained from the imaging device 20 and the tool 30, etc.

Figure 2:
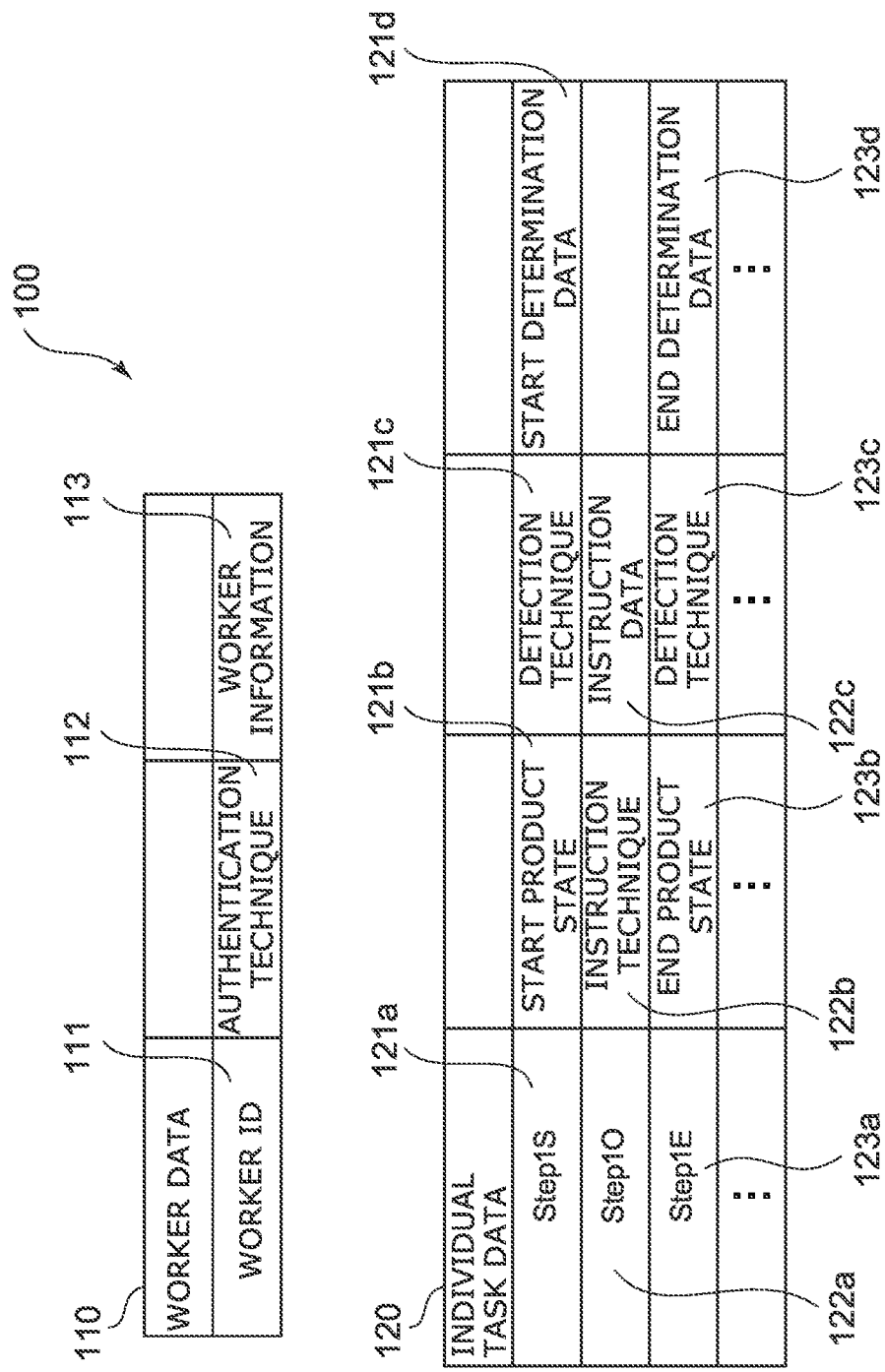
FIG. 2 is a table illustrating the task data.
Figure 3:
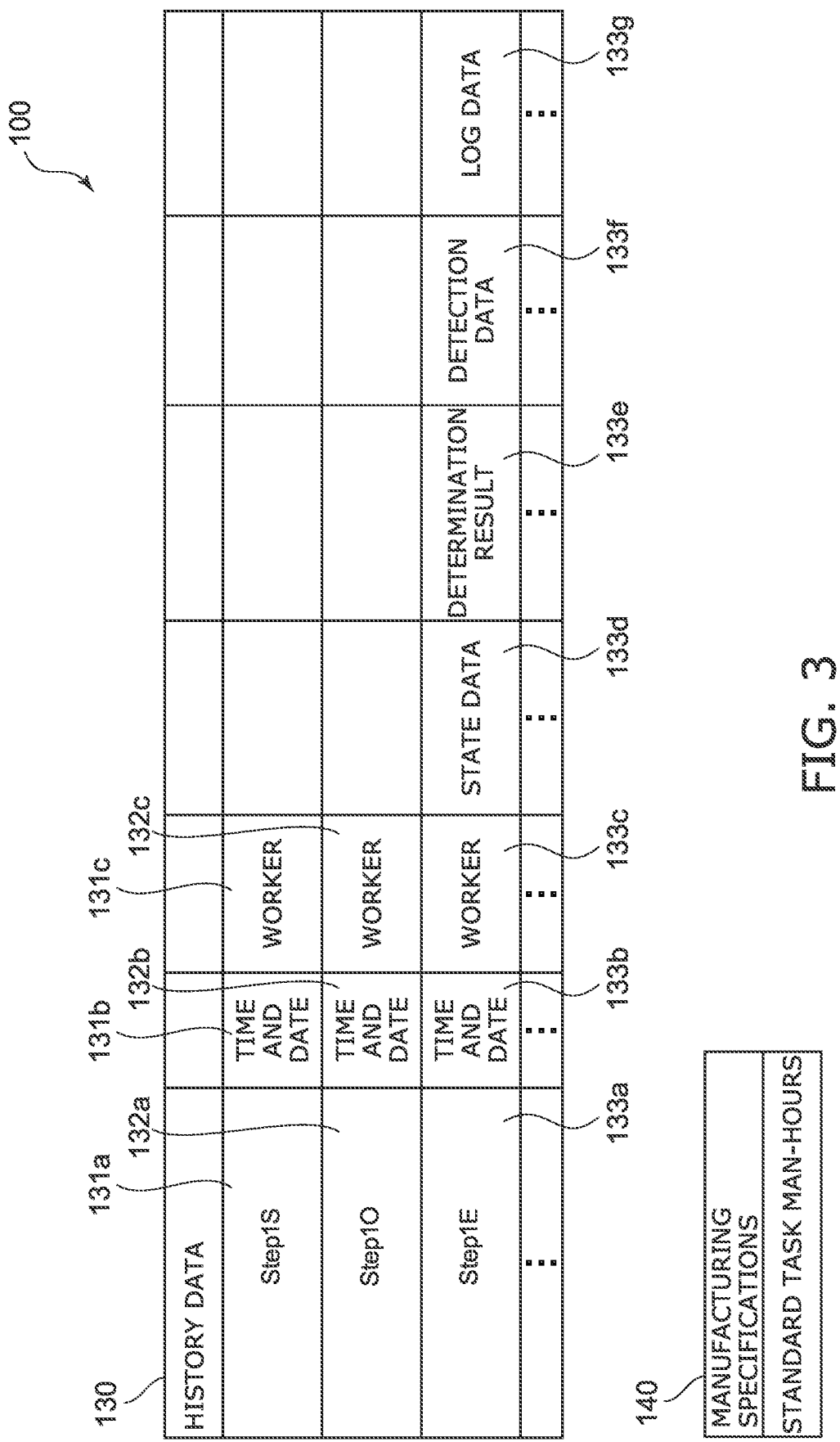
FIG. 3 is a table illustrating the task data.

FIGS. 2 to 4 are tables illustrating the task data.

As shown in FIGS. 2 to 4, task data 100 includes worker data 110, individual task data 120, history data 130, manufacturing specification data 140, and a checklist 150.

As shown in FIG. 2, the worker data 110 includes data related to the worker. The worker data 110 includes a worker ID 111, an authentication technique 112, and worker information 113. The worker ID 111 is a character string for identifying the worker. The authentication technique 112 is a technique for authenticating the worker. Biometric authentication of an image, a fingerprint, a voice, or the like, or physical authentication that uses a security card, a barcode, etc., possessed by the worker are examples of the authentication technique. The worker information 113 includes the name, the affiliated department, etc., of the worker.

The individual task data 120 includes data related to the start of the task, the task-in-progress, and the end of the task for each of the multiple tasks. FIG. 2 illustrates data that is related to the initial task among the multiple tasks.

The individual task data 120 includes a data ID 121a, a start product state 121b, a detection technique 121c, and start determination data 121d as data related to the start of the task. The data ID 121a is a character string for identifying a data set related to the start of the task. The start product state 121b is data of the state of the product when the task is started. The detection technique 121c is the detection technique of the data for determining the task start. The start determination data 121d is data for determining the start of the task.

The individual task data 120 further includes a data ID 122a, an instruction technique 122b, and instruction data 122c as data related to the instruction of the task. The data ID 122a is a character string for identifying a data set related to the instruction of the task. The instruction technique 122b is a technique for outputting the instruction of the task toward the worker. The output technique refers to a display, audio, etc. The instruction data 122c is data of the specific instruction content for the worker.

The individual task data 120 further includes a data ID 123a, an end product state 123b, a detection technique 123c, and end determination data 123d as data related to the end of the task. The data ID 123a is a character string for identifying a data set related to the end of the task. The end product state 123b is data of the state of the product when the task is ended. The detection technique 123c is the detection technique of the data for determining the task end. The end determination data 123d is data for determining the end of the task.

The individual task data 120 includes data related to the start of the task, the task-in-progress, and the end of the task similar to the data illustrated in FIG. 2 for each of the second and subsequent tasks as well.

Detection that uses an image obtained from the imaging device 20, detection that uses a signal transmitted from the digital tool, etc., are examples of the detection techniques 121c and 123c. For one task, the detection technique that is related to the task end may be different from the detection technique related to the task start.

As an example, the extraction of the skeleton of the worker from an image is set as the detection technique 121c or 123c. The imaging device 20 images the work site. The analysis device 10 inputs the image obtained by the imaging device 20 to a model for extracting the skeleton of a human body. The model includes, for example, a neural network. The analysis device 10 refers to the output result from the model and determines that the task is started when the skeleton is extracted. Or, the analysis device 10 may determine that the task is started when it is determined based on the skeleton that the worker has touched a specific object.

As another example, matching between a template image and the obtained image is set as the detection technique 121c or 123c. The imaging device 20 is included in smart glasses attached to the worker. The imaging device 20 images the scene viewed by the worker. The analysis device 10 compares the image obtained by the imaging device 20 and the template image that is prepared beforehand. The analysis device 10 determines that the task is started when a portion of the obtained image matches the template image. An image of the product at the task start, an image of the work site, etc., can be used as the template image.

As another example, the detection of a marker is set as the detection technique 121c or 123c. The marker may be used to determine the task start. The marker is, for example, an augmented reality (AR) marker. Objects of the work site are preregistered as AR markers. A Quick Response (QR) code (registered trademark) may be used as the marker. In such a case, QR codes (registered trademark) are pre-attached to objects of the work site.

As another example, the detection of a signal from the tool 30 is set as the detection technique 121c or 123c. The analysis device 10 determines that the task is started when a signal that indicates the task is received from the tool 30.

As shown in FIG. 3, the history data 130 includes the history at the start of the task, the task-in-progress, and at the end of the task for each of the multiple tasks. FIG. 3 illustrates the history of the initial task among the multiple tasks.

The history data 130 includes a data ID 131a, a time and date 131b, and a worker 131c as the history data at the task start. The data ID 131a is a character string for identifying a data set related to the history at the task start. The time and date 131b is data of the time and date at which the task started. The worker 131c is data of the worker at the task start.

The history data 130 further includes a data ID 132a, a time and date 132b, and a worker 132c as the history data of the task-in-progress. The data ID 132a is a character string for identifying a data set related to the history of the task-in-progress. The time and date 132b is data of the time and date at which the output instruction is performed. The content of the output instruction is based on the instruction data 122c. The worker 132c is data of the worker that performs the instruction.

The history data 130 further includes a data ID 133a, a time and date 133b, a worker 133c, state data 133d, a determination result 133e, detection data 133f, and log data 133g as the history data at the task end. The data ID 133a is a character string for identifying a data set related to the history at the task end. The time and date 133b is data of the time and date at which the task is ended. The worker 133c is data of the worker at the task end. The state data 133d is data of the state of the product at the task end. For example, an image of the product at the task end is used. The determination result 133e is the determination result of whether or not the task has ended, whether or not the data of the detection technique 123c is normal, etc. The detection data 133f is data obtained by the detection technique 123c at the task end. The log data 133g includes the history of the data obtained by the tool 30 in the task.

The history data 130 includes data of the history at the start of the task, of the task-in-progress, and at the end of the task similar to the data illustrated in FIG. 3 for each of the second and subsequent tasks as well.

The manufacturing specification data 140 is data of elements related to the manufacture. The manufacturing specification data 140 includes standard task man-hours 141. The standard task man-hours 141 is the standard man-hours of each task.

As shown in FIG. 4, the checklist 150 includes a name 151 of each task, a start time 152 of each task, an end time 153 of each task, man-hours 154 of each task, and checks 155. The start time 152 and the end time 153 are input based on the determination results by the analysis device 10 respectively of the start and the end. The period from the start time 152 to the end time 153 corresponds to the man-hours 154. The check 155 is input when the task is determined to have ended.

The task data 100 is generated for each product. For example, even for the same type of product, the task data is generated for each product when at least a portion of the task content or the task sequence of the manufacturing process is different between the products.

Figure 5:
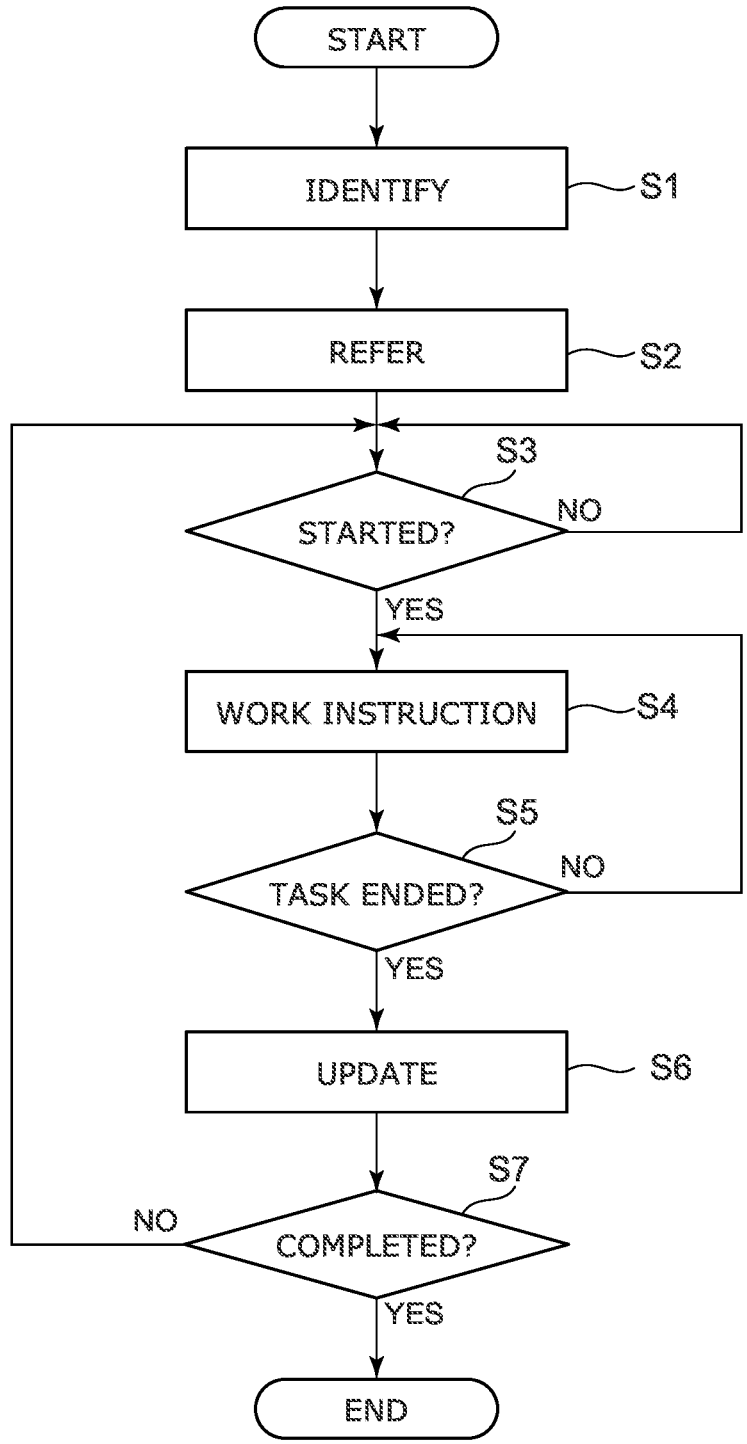
FIG. 5 is a flowchart showing processing according to the analysis device according to the embodiment.

FIG. 5 is a flowchart showing processing according to the analysis device according to the embodiment.

The analysis device 10 identifies the worker according to the authentication technique 112 (processing S1). For example, the analysis device 10 receives an image of the face of the worker from the imaging device 20. The analysis device 10 identifies the worker by performing face recognition from the image. The analysis device 10 may receive fingerprint data of the worker from a fingerprint sensor and identify the worker based on the fingerprint data. The analysis device 10 may receive voice data of the worker from a microphone and identify the worker based on the voice data. The analysis device 10 may receive the reading result of a security card of the worker from a card reader and identify the worker based on the reading result. The analysis device 10 may receive the reading result of a barcode or the like assigned to each worker and identify the worker based on the reading result.

The analysis device 10 refers to the task data related to the performed task (processing S2). For example, the user uses the input device 40 to select the manufacturing process to be performed. The analysis device 10 accepts the selection result and refers to the selected task data. The worker may be pre-associated with the task to be performed. In such a case, the analysis device 10 refers to task data associated with the worker identified in the processing S1. The manufacturing process to be performed may be automatically selected based on the progress result of another task, etc.

The analysis device 10 continuously receives data from the imaging device 20 and the tool 30. The analysis device 10 determines the start of the task by comparing the start determination data 121d and the data of the detection technique specified by the detection technique 121c (processing S3).

When the start of the task is determined, the analysis device 10 outputs a work instruction based on the instruction data 122c to the output device 50 (processing S4). For example, the analysis device 10 causes a display to show the work instruction. The analysis device 10 may output the work instruction from a speaker. When smart glasses that include a display are used, the work instruction may be displayed to overlap real space by using AR technology or mixed reality (MR) technology.

The analysis device 10 determines the end of the task by comparing the end determination data 123d and the data of the detection technique specified by the detection technique 123c (processing S5). As an example, the analysis device 10 determines that the task has ended when the signal detected from the tool 30 indicates the completion of the content of the work instruction. As another example, the analysis device 10 compares the image obtained by the imaging device 20 and a template image that is prepared beforehand. The analysis device 10 determines that the task has ended when a portion of the obtained image matches the template image. An image of the product at the task end, an image of the work site, etc., can be used as the template image.

For example, the output of the work instruction is continued until the end of the task is determined. The analysis device 10 updates the task data when the end of the task is determined (processing S6). For example, the analysis device 10 adds the data related to the task that has ended to the history data 130. The analysis device 10 updates the checklist 150 by marking a check in the task determined to have ended.

The analysis device 10 determines whether or not all tasks are completed for the selected manufacturing process (processing S7). When all tasks are not completed, the processing S3 to S6 is repeated for the next task. The analysis device 10 ends the processing when all tasks are completed.

Advantages of the embodiment will now be described.

There are cases where product design is performed for each of a small number of products. For example, the design is performed for one product for equipment such as a plant, a factory, a large ship, etc. Here, such products are called indented products. For indented products, the contents of the tasks, the sequence within one task, etc., are different between the products. The time that is necessary in the manufacturing process also is different between the products.

Task checks are effective for improving the quality of the product. Conventional technology that automatically checks the task is used. However, for the reasons described above, an automatic check of the task is not easy for an indented product. It is therefore common for another worker or a supervisor to perform the check for the manufacturing process of an indented product. On the other hand, it is desirable to reduce the manufacturing cost of indented products to reduce the personnel for checking tasks.

Regarding this problem, the inventors of the application discovered a method that focuses on the state at the task end. In other words, the state of the product, task, or worker at the task end is constant if the task is correctly performed, regardless of the sequence within one task.

Based on this concept, according to the embodiment, the analysis device 10 receives images from the imaging device 20 when the task is being performed. The analysis device 10 receives a detection signal from the tool 30. The analysis device 10 refers to end determination data for determining the end of each of the multiple tasks. Then, the analysis device 10 determines the end of each of the multiple tasks based on the images, the detection signal, and the end determination data.

For example, when the task has not ended, the product in the image has various appearances according to the procedure of the task. On the other hand, the product in the image at the task end has a constant appearance regardless of the procedure of the task. The end of the task can be accurately determined by preregistering the appearance of the product when the task has ended as end determination data and by using the end determination data.

Similarly, various signals are transmitted from the tool 30 in the task according to the procedure of the task. The sequence of the use of the tool 30 also is different according to the procedure of the task. On the other hand, the type, the number, and the like of the signals detected up to the task end are constant regardless of the procedure of the task. The end of the task can be more accurately determined by using end determination data related to the detection signal when the task has ended.

By determining the end of the task, for example, the task history can be generated based on the determination result of the task end from the analysis device 10. It also can be automatically checked whether or not a portion of the task was skipped by comparing the determination result with a procedure manual of the task prepared beforehand, etc. According to the embodiment, the task can be automatically analyzed even when the manufacturing process is different between products such as indented products, etc.

Generally, the size of an indented product is large; and it is difficult to check the entire product in the manufacturing process. The production area of the product is wide, and the task location is very flexible. There are also cases where the worker performs tasks inside the product. Therefore, the task may be performed outside the imaging area of the imaging device 20; and there is a possibility that the end of the task cannot be accurately determined using only the images from the imaging device 20. For this problem, according to the embodiment, the detection signal from the tool 30 is used to determine the task end. The detection signal from the tool 30 can be received regardless of the location at which the task is performed. The end of the task can be more accurately determined by using the detection signal in addition to the image to determine the task end.

Generally, a task is continuously performed according to a predetermined sequence. Therefore, the timing at which the end of the task is determined can be considered to be the timing of the start of the next task. However, to perform more accurate analysis of the task, it is favorable to also determine the start of each task. As described above, the analysis device 10 may refer to the start determination data for determining the start of each of the multiple tasks. The analysis device 10 determines the start of each of the multiple tasks based on the images from the imaging device 20, the detection signal from the tool 30, and the end determination data.

As in the flowchart shown in FIG. 5, it is favorable for the analysis device 10 to cause the output device 50 to output a work instruction related to the task while one of the multiple tasks is being performed. The task to be performed by the worker can be easily ascertained thereby.

As shown in FIG. 4, it is favorable for the analysis device 10 to calculate the man-hours of each task based on the determination results of the start and the end of each task. The analysis device 10 records the man-hours in the task data 100. The analysis device 10 may compare the calculated man-hours to the standard task man-hours of the task data 100. When the calculated man-hours are greater than the standard task man-hours, the analysis device 10 may cause the output device 50 to output information of the calculated man-hours.

The analysis device 10 may calculate the cost of the multiple tasks based on the calculated man-hours. The memory device 60 stores a cost model (e.g., a function) of the relationship between man-hours and cost. The cost model is prepared beforehand by the user. When the man-hours are calculated for each task, the analysis device 10 inputs the sum of the man-hours to the cost model. The analysis device 10 acquires the output value of the cost model as the cost. The analysis device 10 may record the cost in the task data and may output the cost to the output device 50.

As shown in FIG. 4, it is favorable for the task data to include a check sheet for checking the end of each task. The analysis device 10 inputs the data to the check sheet based on the determination results of the start and the end. By checking the check sheet, the user can easily ascertain whether or not each task has ended.

The analysis device 10 may determine whether or not the task is performed according to the work instruction that is output. By determining whether or not the work instruction is performed, the skipping of tasks can be suppressed, and the quality of the product can be improved.

Figure 6:
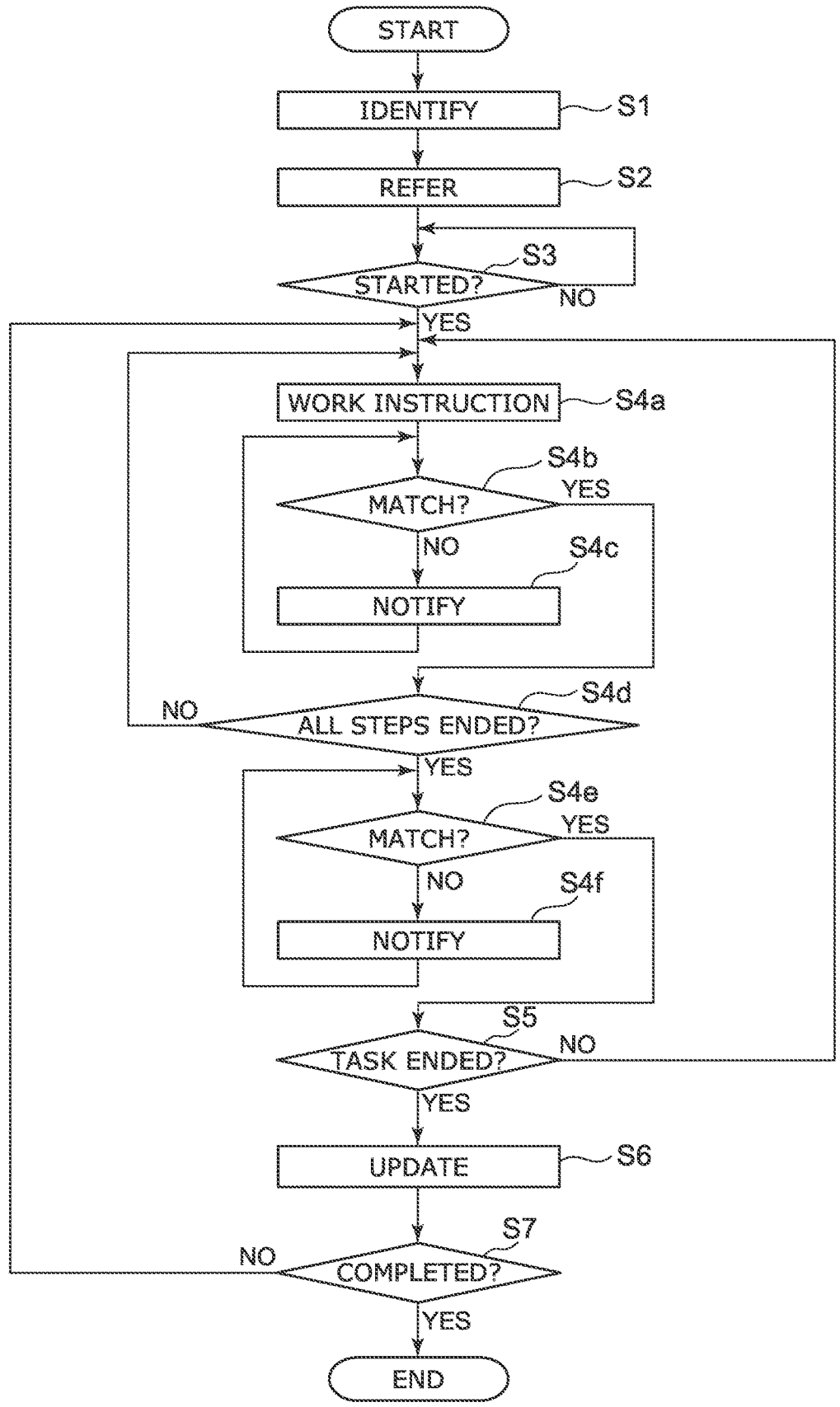
FIG. 6 is a flowchart showing another processing according to the analysis device according to the embodiment.

FIG. 6 is a flowchart showing another processing according to the analysis device according to the embodiment.

Compared to the flowchart shown in FIG. 5, the flowchart shown in FIG. 6 includes processing S4*a* to S4*f* instead of the processing S4.

One task includes at least one step. The analysis device 10 outputs a work instruction related to the one step (the processing S4*a*). After the output of the work instruction, the analysis device 10 determines whether or not the performed task matches the work instruction based on the image or the detection signal (processing S4*b*). When the performed task does not match the work instruction, the analysis device 10 outputs a notification from the output device 50 (processing S4*c*). For example, the notification indicates that the task is erroneous. The notification may be output as a sound or may be output to a display. When the performed task matches the work instruction, the analysis device 10 determines whether or not all of the steps included in the task have ended (processing S4*d*).

When all of the steps have ended, the analysis device 10 determines whether or not the content that is performed in the task matches the overall work instruction (processing S4*e*). When the performed task does not match the overall work instruction, the analysis device 10 outputs a notification from the output device 50 (the processing S4*f*). For example, the component to be held, the mounting direction of the component, the orientation of the screw, the strength of the tightening, etc., are set as the work instruction for each step. The number of fastened screws, the state (the shape and the position) of the assembled unit, etc., are set as the overall work instruction.

When the performed task matches the overall work instruction, the analysis device 10 determines whether or not the task has ended (the processing S5). The match between the performed task and the overall work instruction may be set as the determination condition of the task end.

As described above for indented products, the procedure and the like of the tasks may be different between the products. Also, the production area is wide, and the task location is highly flexible. Therefore, to determine the ends of the detailed steps of one task, many detectors or high performance detectors are necessary, and the manufacturing cost increases. For this problem, according to the embodiment, at least one step included in one task is defined, and the work instruction is set for each step. Thereby, the ends of the steps can be determined by preparing the detection techniques corresponding to the work instructions. The quality of the product and the task can be improved while suppressing the increase of the manufacturing cost.

FIGS. 7 to 11 are schematic views showing an output example according to the analysis device according to the embodiment.

Figure 7:
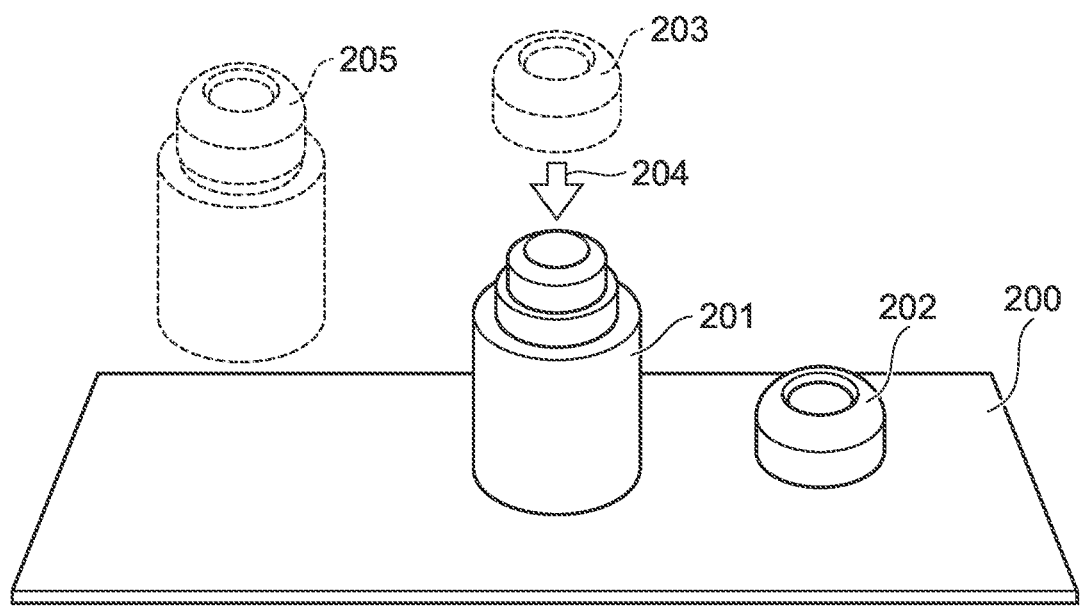
FIG. 7 is a schematic view showing an output example according to the analysis device according to the embodiment.

As an example, the assembly task of a portion (a unit) of the product to be manufactured is performed. The worker wears smart glasses that include the imaging device 20, the input device 40, and the output device 50. FIG. 7 is a schematic view showing the scene viewed by the worker through the smart glasses.

In the example shown in FIG. 7, components 201 and 202 are placed on a workbench 200. For example, template images of the components 201 and 202 are prepared. The analysis device 10 determines the start of the assembly task of the components 201 and 202 by performing matching between the template image and the image from the imaging device 20. Or, another imaging device 20 images the vicinity of the workbench 200. The analysis device 10 determines the start of the task when the skeleton of the worker is recognized at the vicinity of the workbench 200. The analysis device 10 may determine the start of the task when determining that the worker touched the component 201 or 202 based on the skeleton of the worker.

When the start of the task is determined, the analysis device 10 causes the display of a component image 203, a symbol 204, and a completion image 205. The component image 203 shows the component 202. The symbol 204 shows that the component 202 is mounted to the component 201 from above. The completion image 205 shows the state in which the component 202 is mounted to the component 201. For example, the analysis device 10 refers to a computer-aided design (CAD) drawing of the component 202 and the assembled unit and displays the CAD drawings of the component 202 and the assembled unit as the component image 203 and the completion image 205.

Figure 8:
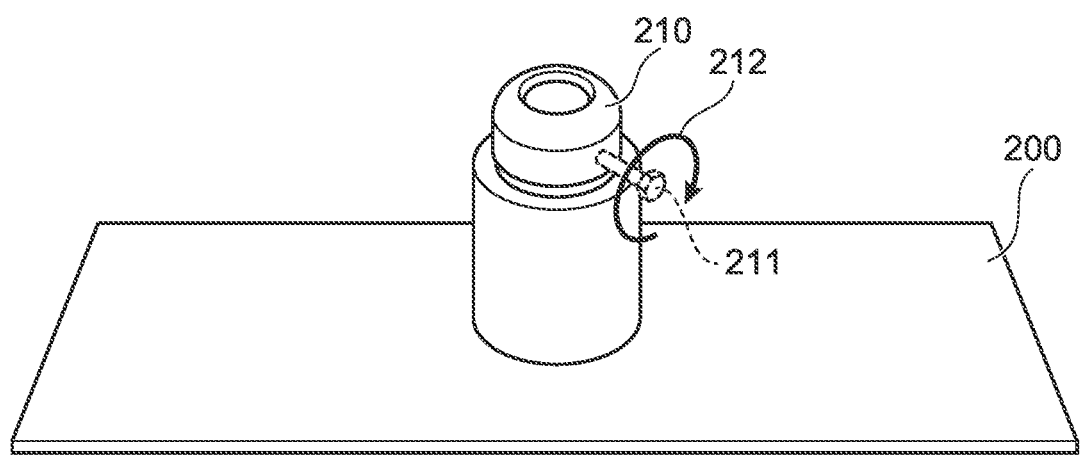
FIG. 8 is a schematic view showing an output example according to the analysis device according to the embodiment.
Figure 9:
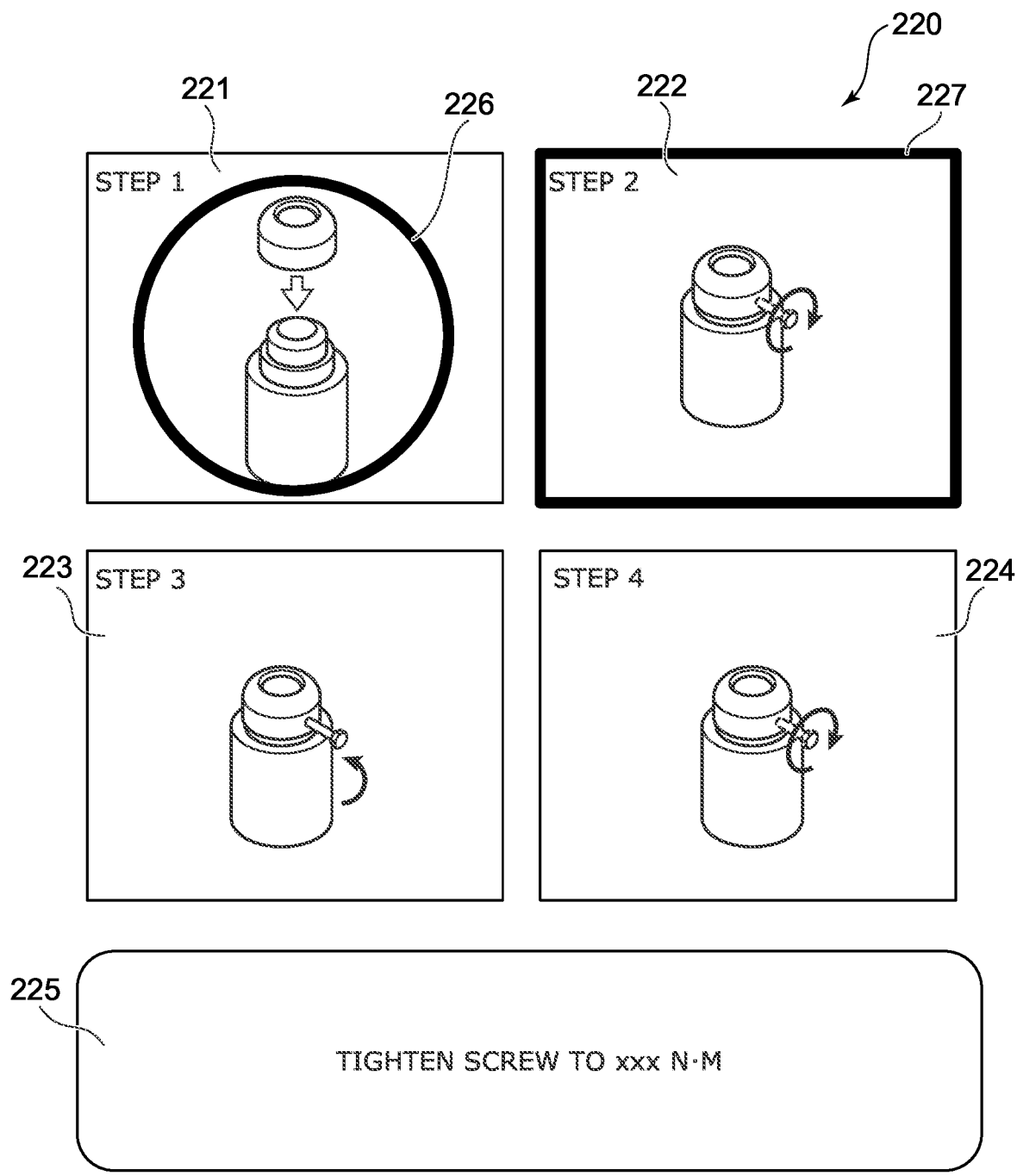
FIG. 9 is a schematic view showing an output example according to the analysis device according to the embodiment.

When the component 202 is mounted to the component 201, a component 210 is obtained as shown in FIG. 8. For example, a template image of the component 210 is prepared. The analysis device 10 uses the matching of the template image and the image from the imaging device 20 to determine that the step of placing the component 202 on the component 201 is completed. The analysis device 10 causes the display of the work instruction of the next step.

In the example shown in FIG. 8, a symbol 213 and an image 212 of a screw are displayed at the component 210. The symbol 213 shows the fastening of the screw to the component 202. The fastening is performed using a digital torque wrench that functions as the tool 30. Based on the detection signal from the tool 30, the analysis device 10 determines whether or not the fastening of the screw has started, the fastening direction of the screw is appropriate, the fastening of the screw is completed, etc.

In the task, the analysis device 10 may display all of the work instructions of the multiple steps. In the example shown in FIG. 9, a work instruction 220 that includes a message 225 and work instructions 221 to 224 of the four steps of the assembly of the unit are displayed. The completed step and a step in progress are suggested by symbols 226 and 227. The message 225 shows a specific instruction related to the step in progress.

Figure 10:
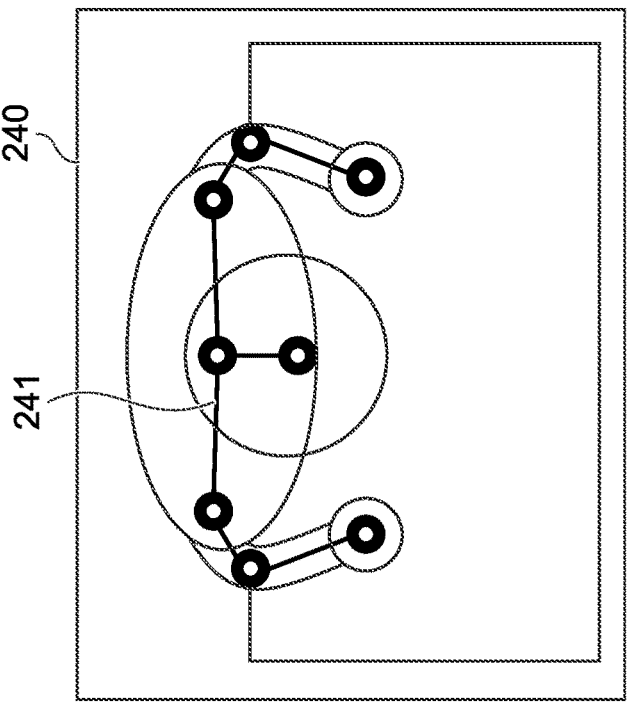
FIG. 10 is a schematic view showing an output example according to the analysis device according to the embodiment.

As shown in FIG. 10, the analysis device 10 may display a check sheet 230 during the task. The check sheet 230 includes a name 231 of the step, a history 232, man-hours 233, and a difference 234. The history 232 shows whether or not each step is completed. The completed steps are marked with a check. The man-hours 233 include actual man-hours 233a and standard man-hours 233b for each step. The actual man-hours 233a are the time actually necessary for the step. The standard man-hours 233b are the standard time necessary for the step. The difference 234 is the difference between the actual man-hours 233a and the standard man-hours 233b. The analysis device 10 also may display an image 240 obtained from another imaging device 20 as shown in FIG. 10. A skeleton 241 of the worker is shown in the image 240.

Figure 11:
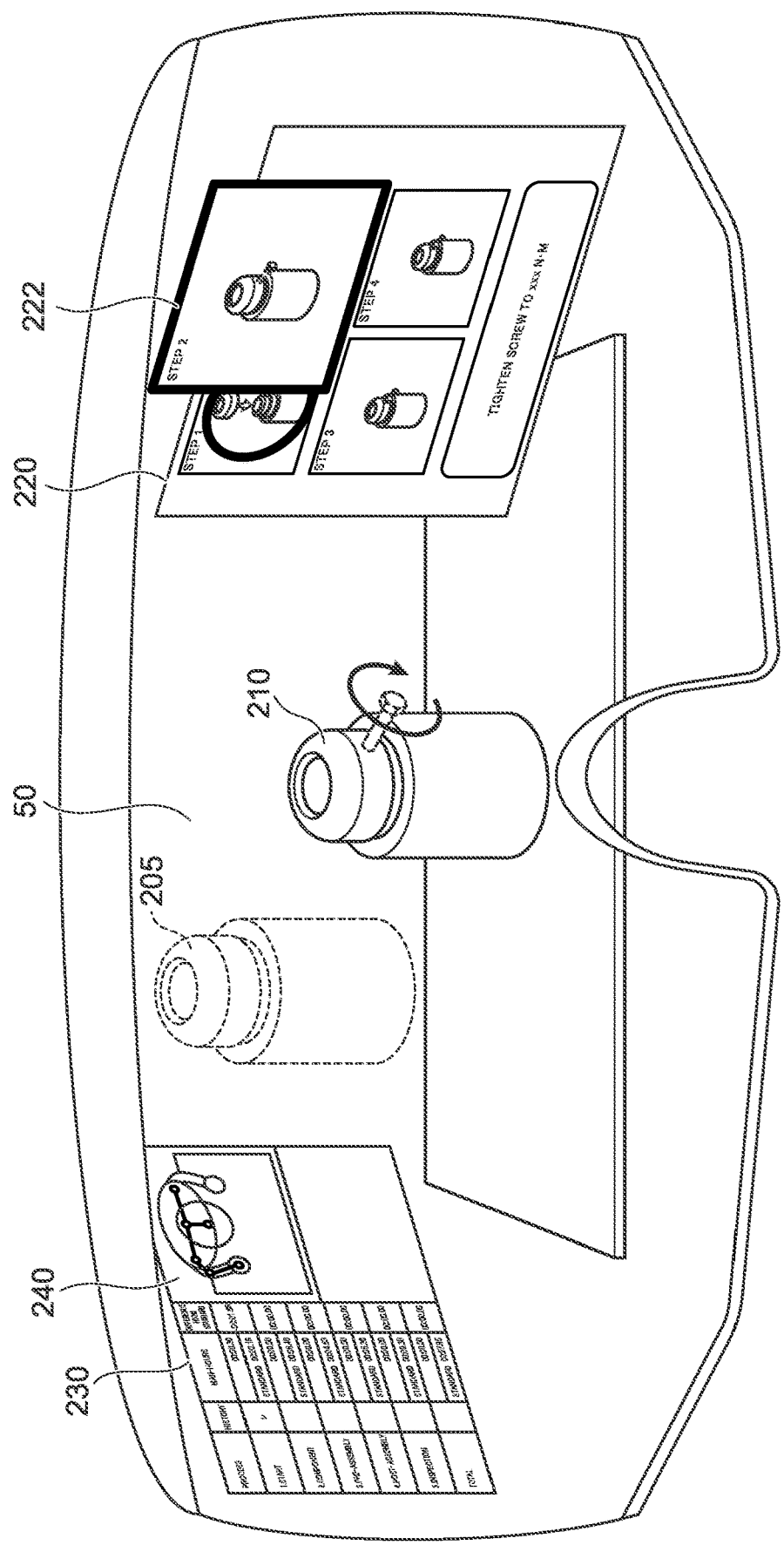
FIG. 11 is a schematic view showing an output example according to the analysis device according to the embodiment.

As shown in FIG. 11, at least one selected from the group consisting of the completion image 205, the work instruction 220, the check sheet 230, and an image may be displayed in the output device 50 of the smart glasses to overlap real space by using AR technology or MR technology. At least one selected from the group consisting of the completion image 205, the work instruction 220, the check sheet 230, and an image may be selectable using MR technology. For example, the selected data is reduced or enlarged.

An interruption of the task may be determined by the analysis device 10. For example, the analysis device 10 determines that the task is interrupted when the skeleton of a human body is not detected in the image of the work site for a period that is greater than a prescribed period of time between the determination of the task start and the determination of the task end. After determining the interruption, the analysis device 10 determines that the task is restarted when the skeleton of a human body again is detected in the image of the work site. The analysis device 10 may determine that the task is interrupted when a detection signal that indicates that the worker has gripped the tool 30 is not transmitted from the tool 30 for a time that is greater than a prescribed period of time between the determination of the task start and the determination of the task end. After determining the interruption, the analysis device 10 determines that the task is restarted when the detection signal of the gripping of the tool 30 is transmitted from the tool 30.

Figure 12:
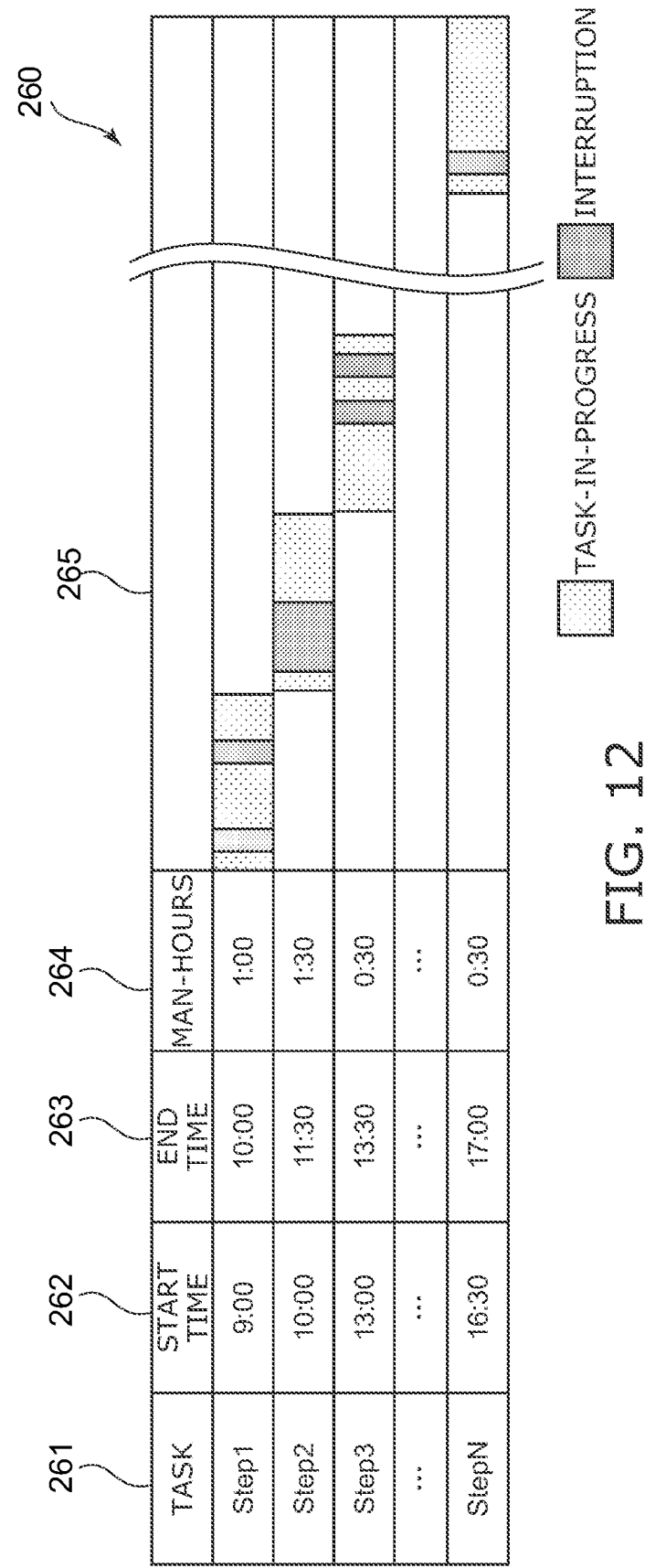
FIG. 12 is a schematic view showing an output example according to the analysis device according to the embodiment.

FIG. 12 is a schematic view showing an output example according to the analysis device according to the embodiment.

As shown in FIG. 12, the analysis device 10 may display a Gantt chart 260. The Gantt chart 260 includes a name 261 of the task, a start time 262, an end time 263, a task time 264, and a chart 265. The time frame of the task and the time frame of the interruption are displayed to be discriminable in the chart 265.

A simulation of the manufacturing process may be performed using the analysis device 10, the task data 100, data of the product to be manufactured, etc.

Figure 13:
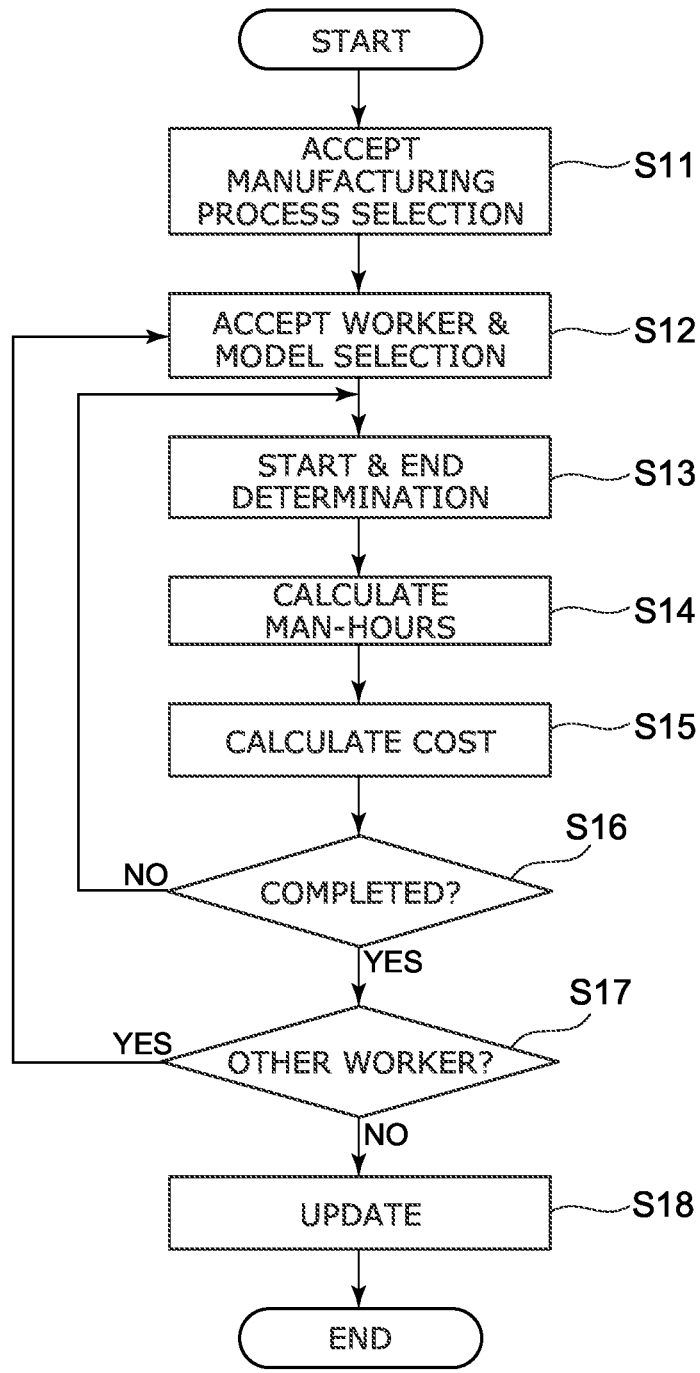
FIG. 13 is a flowchart showing processing when performing a simulation according to the analysis device according to the embodiment.

FIG. 13 is a flowchart showing processing when performing a simulation according to the analysis device according to the embodiment.

The user selects a manufacturing process to be simulated. The analysis device 10 accepts the selection (processing S11). The user selects the worker to be simulated and a cost model for the cost calculation. The analysis device 10 accepts the selections (processing S12). After selecting, the simulation is started.

In the simulation, the user wears smart glasses that include the imaging device 20 and the output device 50 (the display). The analysis device 10 acquires data (e.g., three-dimensional CAD data) of the products, the units, components, etc., related to the manufacturing process. In the simulation of each task, the analysis device 10 causes the objects based on the data to be displayed in the display of the smart glasses. The objects are the products, units, or components when the task is actually performed. The imaging device 20 images the scene of the worker when performing the simulation. MR technology is used for the display. When the worker that wears the smart glasses performs the task on the virtual objects that are displayed, the objects reflect the task.

When the simulation is started, the analysis device 10 determines the start and the end of the task based on start determination data and end determination data of task data that is preset (processing S13). The determinations of the start and the end are similarly performed in the processing S3 to S6 of the flowchart shown in FIG. 5 or FIG. 6. The analysis device 10 calculates the man-hours of the task from the determination results of the start and the end (processing S14). The analysis device 10 calculates the cost by using the selected cost model (processing S15). The analysis device 10 determines whether or not the selected worker has completed all of the tasks to be performed (processing S16).

When all of the tasks are not completed, the analysis device 10 re-performs the processing S13 for the next task. When all of the tasks are completed, the analysis device 10 determines whether or not tasks to be performed by another worker exist in the selected manufacturing process (processing S17). The processing S12 is re-performed when tasks to be performed by another worker exist. When tasks to be performed by another worker do not exist, the analysis device 10 updates the task data based on the calculated man-hours and the cost (processing S18). For example, the analysis device 10 updates the standard task man-hours based on the calculated man-hours. The analysis device 10 also may generate a distribution of the man-hours or the cost for multiple tasks.

The simulation may be performed before the actual manufacturing process or after completing of the manufacturing process. By performing the simulation before the manufacturing process, the worker can experience the task beforehand. The quality of the task in the actual manufacturing process can be improved thereby. Also, the man-hours and the cost can be estimated beforehand with higher accuracy. By performing the simulation after the manufacturing process, the worker can practice tasks that were slower than the standard task man-hours, etc. The simulation may be performed before and after the manufacturing process. Data such as the standard task man-hours set based on the simulation before the manufacturing process, etc., may be corrected according to the simulation results after the manufacturing process.

Figure 14:
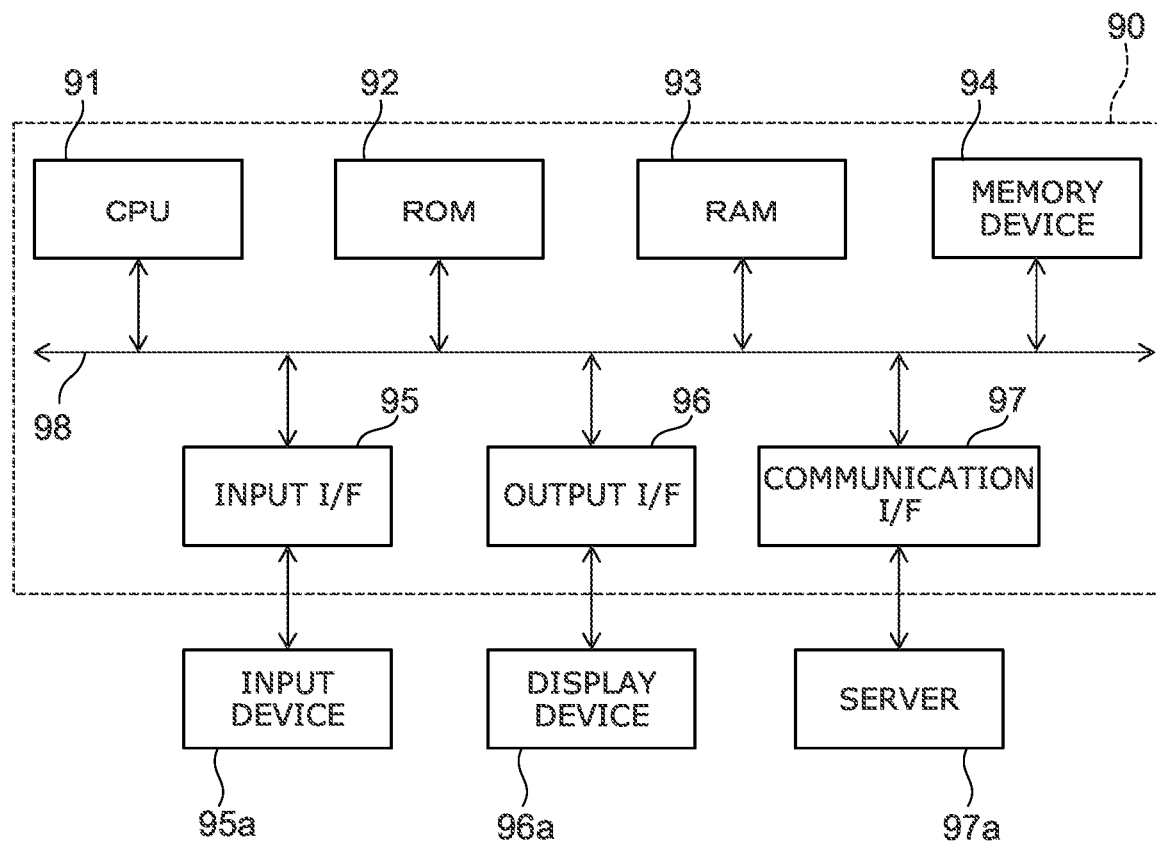
FIG. 14 is a schematic view showing a hardware configuration.

FIG. 14 is a schematic view showing a hardware configuration.

The analysis device 10 includes, for example, the configuration of a computer 90 shown in FIG. 14. The computer 90 includes a CPU 91, ROM 92, RAM 93, a memory device 94, an input interface 95, an output interface 96, and a communication interface 97. The functions of the analysis device 10 may be realized by the collaboration of two or more computers.

The ROM 92 stores programs that control the operations of the computer 90. A program that is necessary for causing the computer 90 to realize the processing described above is stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the program, the CPU 91 performs various processing by controlling configurations via a system bus 98.

The memory device 94 stores data necessary for executing the programs and data obtained by executing the programs.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and an output device 96a. The output I/F 96 is, for example, an image output interface such as Digital Visual Interface (DVI), High-Definition Multimedia Interface (HDMI (registered trademark)), etc. The CPU 91 can transmit the data to the output device 96a via the output I/F 96 and can cause the output device 96a to display the image.

The communication interface (I/F) 97 connects the computer 90 and a server 97a that is outside the computer 90. The communication I/F 97 is, for example, a network card such as a LAN card, etc. The CPU 91 can read various data from the server 97a via the communication I/F 97.

The memory device 94 includes at least one selected from a hard disk drive (HDD) and a solid state drive (SSD). The input device 95a includes at least one selected from a mouse, a keyboard, a microphone (audio input), and a touchpad. The output device 96a includes at least one selected from a display and a projector. A device such as a touch panel that functions as both the input device 95a and the output device 96a may be used.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or a recording medium (a non-transitory computer-readable storage medium) that can be read by another nontemporary computer.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

According to the analysis device, the analysis system, or the analysis method described above, a task can be automatically analyzed. Similar effects can be obtained by using a program to cause a computer to perform the analysis method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. An analysis device performing an analysis related to a plurality of tasks of a manufacturing process, the analysis device comprising circuitry configured to
receive an image when each of the plurality of tasks is performed,
extract a skeleton of a human body from the image,
receive a detection signal detected by a tool used in at least one of the plurality of tasks,
determine a start of each of the plurality of tasks when the extracted skeleton touches a first object, and
determine an end of each of the plurality of tasks based on the images, the detection signal, and end determination data for determining an end of each of the plurality of tasks.

2. The analysis device according to claim 1, wherein the circuitry is configured to cause an output device to output a work instruction related to one of the plurality of tasks when the one of the plurality of tasks is performed.

3. The analysis device according to claim 1, wherein the circuitry is configured to calculate man-hours of each of the plurality of tasks based on a determination result of the start and the end of each of the plurality of tasks.

4. The analysis device according to claim 3, wherein the circuitry is configured to
refer to a cost model of a relationship between man-hours and cost for each of the plurality of tasks, and calculate a cost of the plurality of tasks based on the cost model and the calculated plurality of man-hours.

5. The analysis device according to claim 1, wherein the tool includes at least one selected from the group consisting of a torque sensor, an acceleration sensor, and an angular velocity sensor.

6. The analysis device according to claim 1, wherein the circuitry is configured to
refer to a check sheet for checking the end of each of the plurality of tasks, and
mark a check in the check sheet according to the determination of the end of each of the plurality of tasks.

7. The analysis device according to claim 1, wherein the circuitry is configured to
refer to instruction data of a work instruction of at least one of the plurality of tasks, and
use the images, the detection signal, and the instruction data to determine whether or not a task performed in the at least one of the plurality of tasks matches the work instruction.

8. The analysis device according to claim 1, wherein the circuitry is configured to determine an interruption of at least one of the plurality of tasks when the skeleton is not extracted from the image for a prescribed period or when the detection signal is not transmitted from the tool the prescribed period.

9. An analysis system, comprising:
the analysis device according to claim 1;
the imaging device; and
the tool.

10. An analysis method causing a computer to perform an analysis related to a plurality of tasks of a manufacturing process,
the analysis method causing the computer to:
receive an image when each of the plurality of tasks is being performed;
extract a skeleton of a human body from the image;
receive a detection signal detected by a tool used in at least one of the plurality of tasks;
determine a start of each of the plurality of tasks when the extracted skeleton touches a first object; and
determine an end of each of the plurality of tasks based on the images, the detection signal, and end determination data for determining an end of each of the plurality of tasks.

11. A non-transitory computer-readable storage medium storing a program for executing the analysis method according to claim 10.

* * * * *